(12) United States Patent
Goldner

(10) Patent No.: US 8,185,151 B2
(45) Date of Patent: May 22, 2012

(54) SYSTEM AND PROCESS FOR INTERNET PROTOCOL MULTIMEDIA SUBSYSTEM CENTRALIZED SERVICE WITH ENHANCED UNSTRUCTURED SUPPLEMENTARY SERVICE

(75) Inventor: Alla Goldner, Tel Aviv (IL)

(73) Assignee: Marvell International Ltd., Hamilton (BM)

( * ) Notice: Subject to any disclaimer, the term of this patent is extended or adjusted under 35 U.S.C. 154(b) by 1077 days.

(21) Appl. No.: 12/100,757

(22) Filed: Apr. 10, 2008

(65) Prior Publication Data

US 2008/0259831 A1    Oct. 23, 2008

Related U.S. Application Data

(60) Provisional application No. 60/912,330, filed on Apr. 17, 2007.

(51) Int. Cl.
*H04Q 7/00* (2006.01)
(52) U.S. Cl. .............. 455/552.1; 370/310; 370/331; 370/352; 455/432.1; 455/435.1
(58) Field of Classification Search ............. 455/552.1, 455/432.1, 435.1; 370/310, 331, 351
See application file for complete search history.

(56) References Cited

U.S. PATENT DOCUMENTS

| | | | |
|---|---|---|---|
| 5,999,825 A * | 12/1999 | Geulen | 455/560 |
| 2003/0008643 A1 | 1/2003 | Hestir | |
| 2007/0058788 A1 | 3/2007 | Mahdi et al. | |
| 2008/0117893 A1 * | 5/2008 | Witzel et al. | 370/352 |
| 2009/0323656 A1 * | 12/2009 | Mahdi | 370/338 |
| 2010/0046501 A1 * | 2/2010 | Witzel et al. | 370/352 |
| 2010/0118861 A1 * | 5/2010 | Witzel et al. | 370/352 |

OTHER PUBLICATIONS

GSM Global System for Mobile Communications; 3GPP TR 23.892 V0.5.1 (May 2007) Technical Report; 3$^{rd}$ Generation Partnership Project; Technical Specification Group Services and System Aspects; IP Multimedia System (IMS) centralized services (Release 8); Entire Document.
International Preliminary Report on Patentability mailed Nov. 26, 2009, and Written Opinion of the Internationl Searching Authority mailed Jul. 8, 2009, for corresponding International Application No. PCT/IB2008/003665, 8 pages.

* cited by examiner

*Primary Examiner* — Jinsong Hu
*Assistant Examiner* — Jean Chang

(57) ABSTRACT

A method of handling Service Data initiated by a wireless network for a mobile station, the mobile station configured to operate in a circuit-switched network and a packet-switched network, includes registering a Circuit Switched Access Adaptation Function in the mobile station for Supplementary Service, and sending a Service Data message initiated by the wireless network to applications registered in the mobile station.

31 Claims, 5 Drawing Sheets

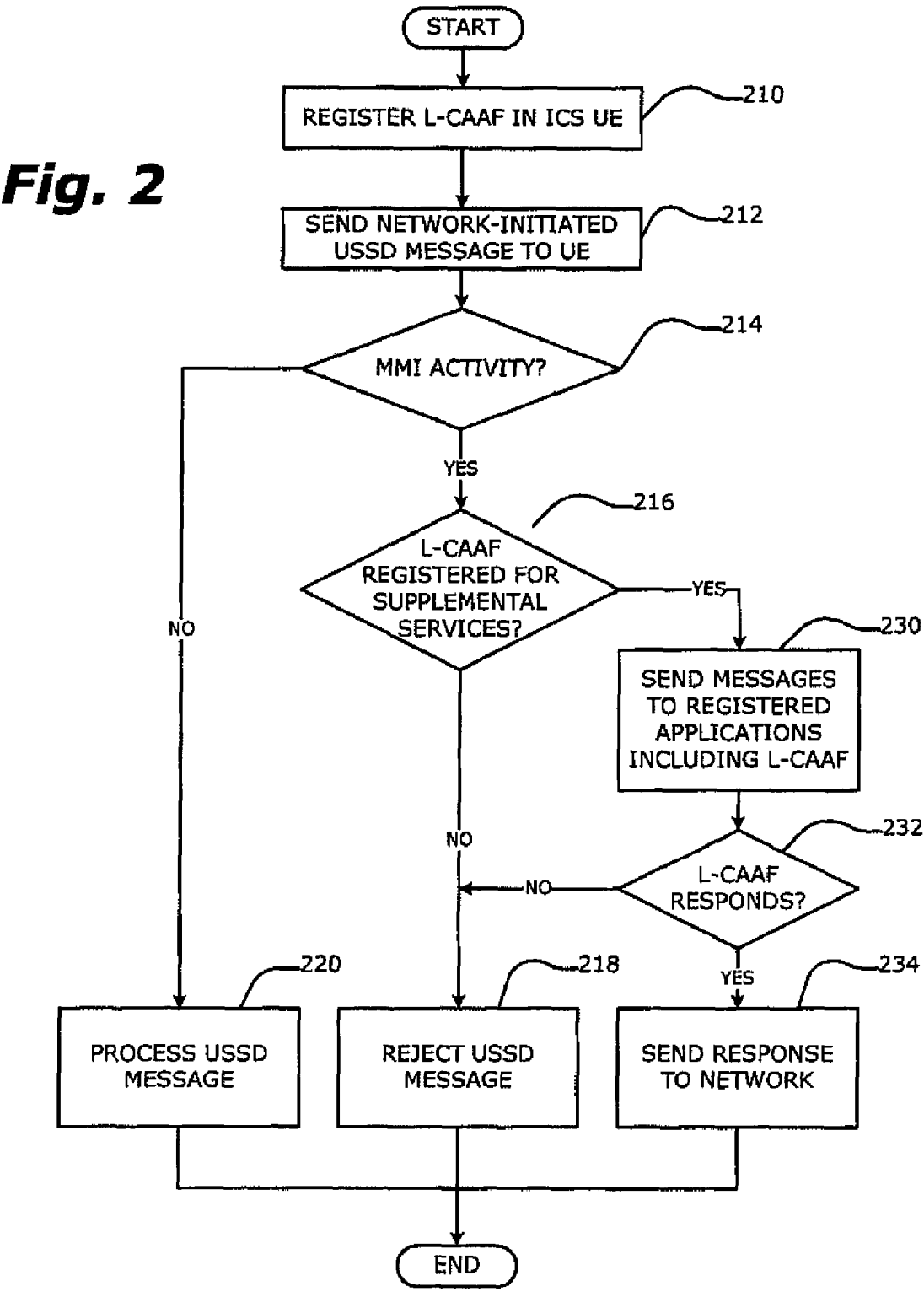

SYSTEM AND PROCESS FOR INTERNET PROTOCOL MULTIMEDIA SUBSYSTEM CENTRALIZED SERVICE WITH ENHANCED UNSTRUCTURED SUPPLEMENTARY SERVICE

CROSS REFERENCE TO PRIOR APPLICATIONS

This application claims priority and the benefit thereof from U.S. Provisional Patent Application Ser. No. 60/912,330 filed on Apr. 17, 2007, which is hereby incorporated by reference in its entirety for all purposes as if fully set forth herein.

BACKGROUND

1. Field

This disclosure is directed to mobile communications using service data, and more particularly to improved mobile communications using Unstructured Supplementary Service Data (USSD) for an Internet Protocol Multimedia Subsystem (IMS) in a network.

2. Related Art

IP Multimedia Subsystem (IMS) is an architectural framework for delivering internet protocol (IP) multimedia to mobile stations. IMS handles several types of media (e.g., audio and video) in a synchronized way from the user's point of view via Internet Protocol (IP). IMS may involve multiple parties, multiple connections, and the addition or deletion of resources and users within a single communication session. Voice Call Continuity (VCC) is an IMS application that provides capabilities to transfer voice calls between a circuit switched (CS) domain and a packet switched (PS) domain. IMS Centralized Services (ICS) Control Channel (hereafter "ICCC") is a logical signaling channel used to transport control signaling between the ICS User Equipment (UE) and an IMS network when the ICS UE accesses the IMS services via the CS domain. Unstructured Supplementary Service Data (USSD) is a standard for transmitting information over Global System for Mobile Communications (GSM) signaling channels and is generally associated with real-time or instant messaging type phone services.

Conventionally, when a mobile station (MS) is engaged in a call or other Man-Machine Interface (MMI) activity, the MS rejects any USSD because such Supplementary Service is considered a lower priority. Accordingly, the USSD for carrying out data is not a reliable transport for ICCC and no viable alternative methods are available to address this issue.

SUMMARY

According to an aspect of the disclosure, a method of handling Service Data initiated by a wireless network for a mobile station, the mobile station configured to operate in a circuit-switched network and a packet-switched network, includes registering a Circuit Switched Access Adaptation Function in the mobile station for Supplementary Service, and sending a Service Data message initiated by the wireless network to applications registered in the mobile station.

According to another aspect of the disclosure, a computer readable medium having a stored computer program embodying instructions, which, when executed by a computer, cause the computer to handle Service Data initiated by a wireless network for a mobile station, the mobile station configured to operate in a circuit-switched network and a packet-switched network, includes instructions for registering a Circuit Switched Access Adaptation Function to the mobile station for Supplementary Service, and instructions for sending a Service Data message initiated by the wireless network to applications registered in the mobile station.

In yet another aspect of the disclosure, a system configured to handle Service Data initiated by a wireless network, includes an IP Multimedia Service Control module configured to register a Circuit Switched Access Adaptation Function to a mobile station for Supplementary Service, and a Call Session Control module configured to send a Service Data message initiated by the wireless network to applications registered in the mobile station.

In yet another aspect of the disclosure, a system for an Internet Protocol Multimedia Subsystem network, includes a non-Internet Protocol Multimedia Subsystem Centralized Services User Equipment roaming within the Internet Protocol Multimedia Subsystem network, a Mobile Switching Center configured to provide circuit-switched domain calling services to the non-Internet Protocol Multimedia Subsystem Centralized Services User Equipment, a Call Session Control Function responsible for signaling of the IMS network, and an Internet Protocol Multimedia Subsystem Centralized Service Control Function configured to control the signaling between the Internet Protocol Multimedia Subsystem network and the Mobile Switching Center when the non-Internet Protocol Multimedia Subsystem Centralized Services User Equipment accesses the Internet Protocol Multimedia Subsystem network via the circuit-switched domain, and further configured to register the non-Internet Protocol Multimedia Subsystem Centralized Services User Equipment for the Supplementary Service.

In yet another aspect of the disclosure, a system for an Internet Protocol Multimedia Subsystem network, includes a mobile station roaming within the Internet Protocol Multimedia Subsystem network, a Call Session Control Function responsible for signaling of the Internet Protocol Multimedia Subsystem network, and an Internet Protocol Multimedia Subsystem Centralized Service Control Function configured to control the signaling between the Internet Protocol Multimedia Subsystem network and the mobile station when the mobile station accesses the Internet Protocol Multimedia Subsystem network via a circuit-switched domain, and further configured to register the mobile station for Supplementary Services.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 2 shows a flowchart of a process for handling network initiated USSD (Unstructured Supplementary Service Data) for ICS UE, operating according to the principles of the disclosure;

DETAILED DESCRIPTION

Figure 1A:
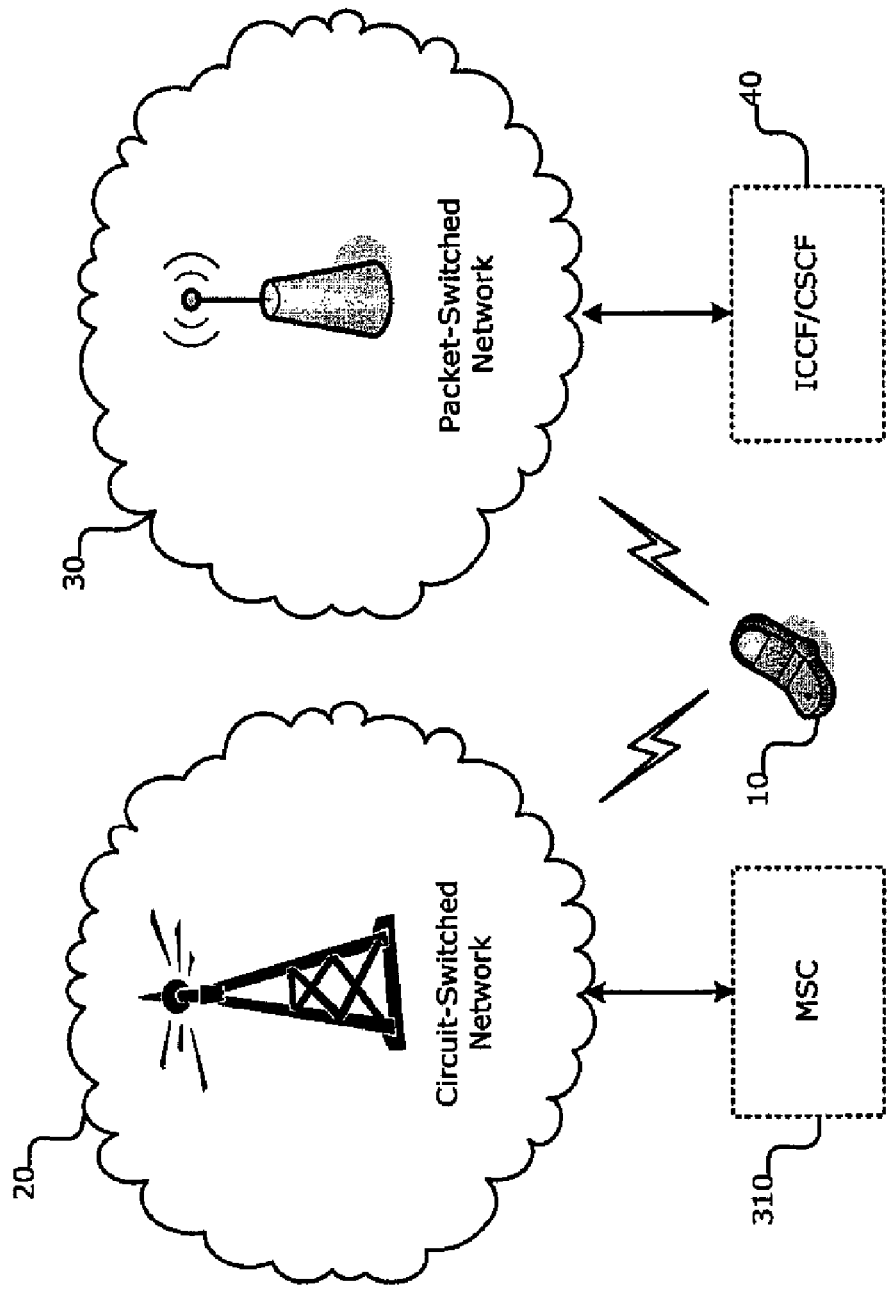
FIG. 1A shows a system overview of a circuit-switched network, a packet-switched network and an Internet Protocol (IP) Multimedia Subsystem (IMS) Centralized Services (CS) User Equipment (UE) constructed according to the principles of the disclosure.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

FIG. 1A shows a system overview of a circuit-switched network, a packet-switched network and an Internet Protocol (IP) Multimedia Subsystem (IMS) Centralized Services (CS) User Equipment (UE) constructed according to the principles of the disclosure. The system may be used to reliably carry Supplementary Services to a user equipment (UE) or mobile station (MS) 10 via a circuit-switched (CS) network 20 or a packet-switched (PS) network 30. In particular, the CS network 20 may provide mobile phone functionality and the PS network 30 may provide WLAN phone functionality. The CS network 20 may include a Mobile Switching Center (MSC), or for example, Visited Mobile Switching Center (VMSC), which will be discussed below. As mentioned above, when the UE 10 is engaged in a call or other Man-Machine Interface (MMI) activity via the CS network 20 and/or the PS network 30, the UE 10 may reject any USSD because they are considered a lower priority.

Figure 1B:
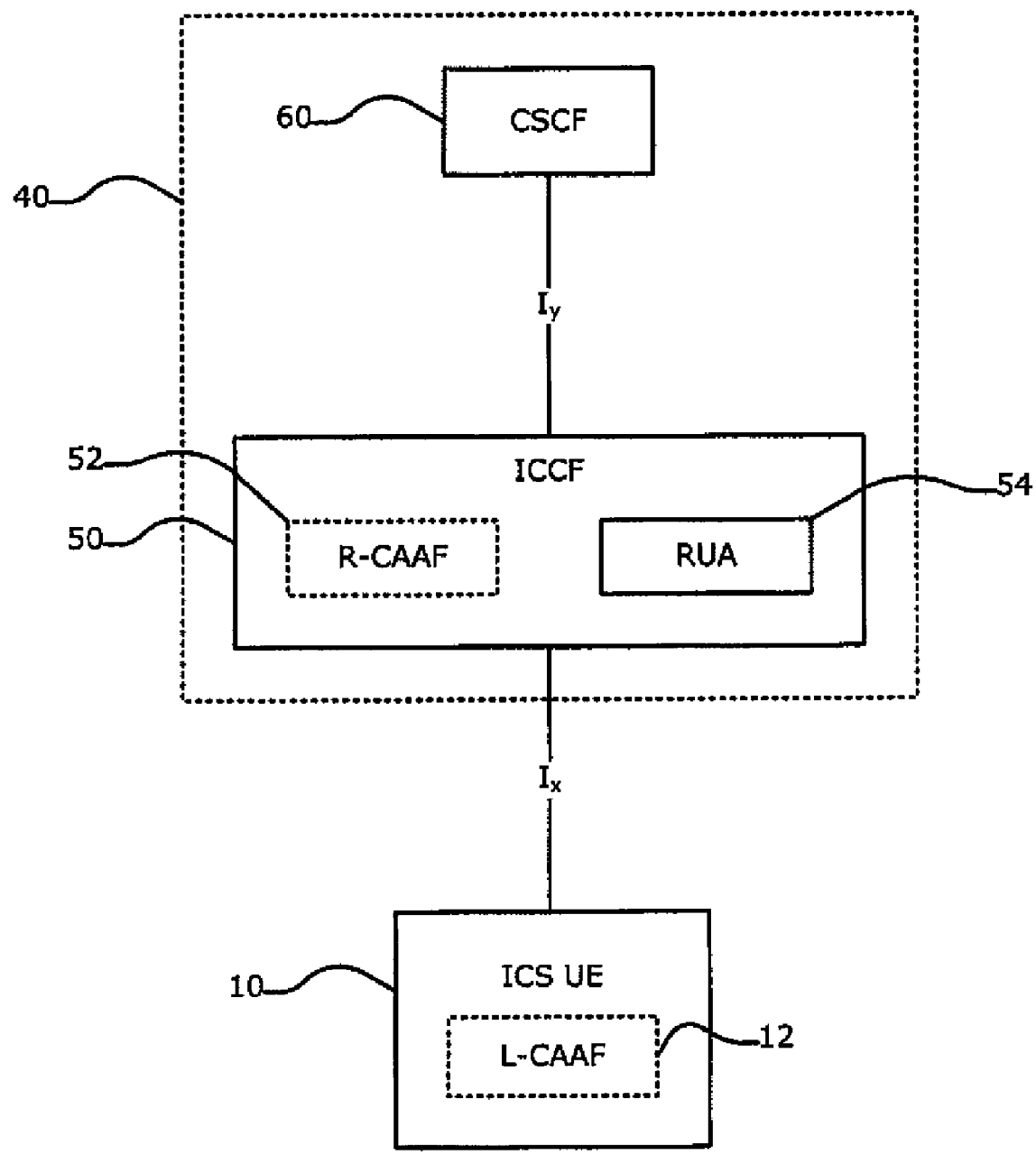
FIG. 1B shows an example of a structure for a functional group ICCF/CSCF and the IMS CS UE of FIG. 1A constructed according to the principles of the disclosure.

FIG. 1B shows an example of a structure for the functional group ICCF/CSCF 40 and the UE 10 constructed according to the principles of the disclosure. As shown therein, the ICCF/CSCF 40 may include IMS CS Control Function (ICCF) 50 and Call Session Control Function (CSCF) 60. The CSCF 60 is a central component to signaling and control within the IMS network. The CSCF 60 may be subdivided into three separate parts and may be responsible for all signaling via Session Initiation Protocol (SIP) between Transport Plane, Control Plane, and the Application Plane of the IMS.

The ICCF 50 may provide IMS services for CS calls and for calls transferred between CS and PS access networks. The ICCF 50 belongs to the IMS network and may include two functions: a Remote CS Access Adaptation Function (R-CAAF) 52 and a Remote User Agent (RUA) 54. The RUA 54 may perform SIP User Agent functions on behalf of the UE 10 for the IMS network over CS sessions. Also, the RUA 54 may combine the CS calls established between the ICS UE 10 and the RUA 54 to set up a voice bearer, and the ICCC established between the RUA 54 and the ICS UE 10 either directly or via the CS Access Adaptation Function (CAAF). FIG. 1B particularly shows a Local CAAF (L-CAAF) 12 provided in the ICS UE 10 and a Remote CAAF (R-CAAF) 52 residing in the ICCF 50. The CAAFs 12, 52 may convey the service control signaling information received from the ICS UE 10 over CS access signaling to the RUA 54 and vice versa. The RUA 54 may use the information received from the CAAFs 12, 52 for initiation and control of SIP sessions. The CAAFs 12, 52 may not be employed when SIP is used over PS bearers for the ICCC. Reference line $I_x$ may be used between the ICS UE 10 and the ICCF 50 to implement ICCC, and Reference line $I_y$ may be used between the ICCF 50 and the CSCF 60 for presentation of the SIP User Agent (UA) behavior toward the IMS network for controlling user session.

According to the prior art 3GPP Specification, "if the mobile station (MS) is unable to process the network initiated unstructured supplementary service data operation (e.g., the feature is not supported or the user is engaged in another man-machine interface (MMI) activity) then an error indication shall be returned to the node that originated the operation." (3GPP TS 22.090). Thus, when the prior art MS and prior art system were engaged in a call or other MMI activity, the prior art MS and prior art system rejected any USSD because, for example, such supplemental services are considered a lower priority. Accordingly, the USSD for carrying out data is not a reliable transport for ICCC with the prior art system.

In order to alleviate this problem, according to the disclosure, a function may be registered in the UE 10 for additional services, for example, the Local CS Access Adaptation Function (L-CAAF) 12 may be registered in the UE 10, such as an ICS UE, for a Supplementary Services (SS) procedure. In this regard, when a network-initiated USSD message arrives, the message may be sent to all registered applications within the UE 10, including the L-CAAF 12 in accordance with an embodiment of the disclosure. The L-CAAF registration for the Supplementary Services may be incorporated into a part of the ICS standard.

FIG. 2 shows a flowchart of a process for handling a network initiated USSD for ICS, operating according to an embodiment of the disclosure. With reference to FIG. 2, upon starting the process, the L-CAAF may be registered in an ICS UE at 210. Thereafter, the IMS network may send a network-initiated USSD to the ICS UE at 212. Subsequently, it is determined whether there is MMI activity or not at 214. For example, this may be determined by any network interaction that exceeds a predetermined level. If there is no MMI activity, the network-initiated USSD may be processed at 220, as specified in 3GPP TS 22.090, for example. If there is MMI activity, it may be determined whether the L-CAAF 112 has been registered for the Supplementary Services procedures within the ICS UE 110 at 216. If the L-CAAF 112 has not been registered, the network-initiated USSD message may be rejected at 218, for example, by sending a "FACILITY" message with an error indication according to TS 22.090. If, on the other hand, the L-CMF 112 has been registered for the Supplementary Services procedures within the ICS UE 110, the USSD message may be sent to other registered applications including the L-CAAF at 230. In an embodiment, the USSD message may be sent to all registered applications. Subsequently, it may be determined whether the L-CAAF 112 responds to the USSD message at 232. If there is no response from the L-CAAF 112, the USSD message may be rejected at 218. If the L-CAAF 112 responds to the network-initiated USSD message, the ICS UE 110 may send an appropriate response to the network at 234.

Thus, according to the disclosure, by registering a L-CAAF in an ICS UE, when network-initiated USSD arrives at an ICS UE, even if the user is engaged in another MMI activity, the ICS UE may be able to process the USSD operation, thereby rendering USSD as a reliable transport for ICCC. Also, by registering L-CAAF in ICS UE for the Supplementary Services procedures and sending network-initiated USSD messages to all applications (including L-CAAF) registered in the ICS UE, the ICS UE may be configured to perform various session scenarios. For example, in addition to basic voice service origination and terminating sessions, the ICS UE may perform voice origination and termination service sessions with supplementary services controlled in the IMS network. Particularly, ICS UE with VCC capabilities may perform domain transfers (DT) of basic voice service sessions and voice sessions with mid call and non-mid call services in both directions between circuit-switched and packet-switched domains.

Figure 3:
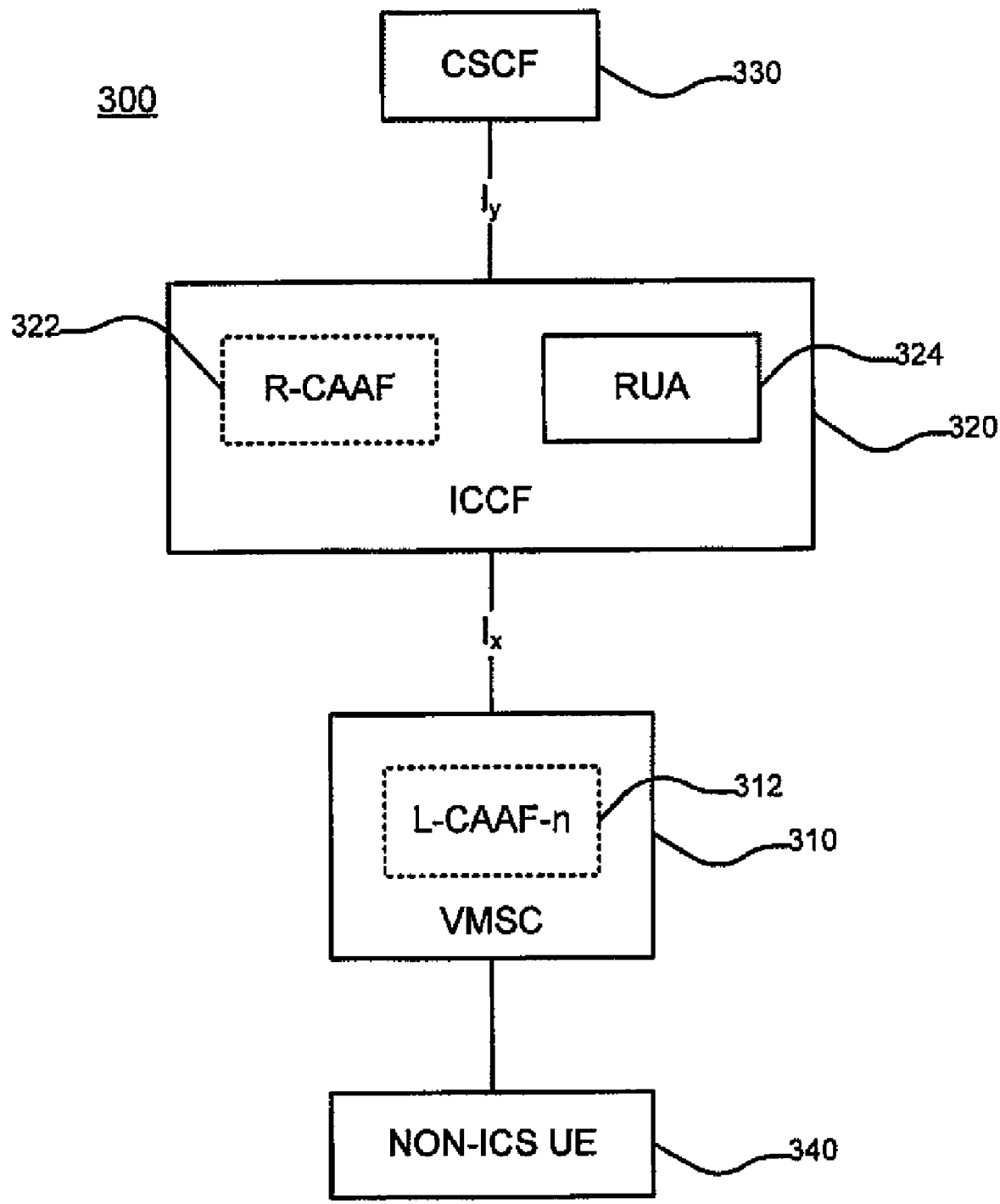
FIG. 3 shows a structural overview of non-ICS UE reference architecture, constructed according to the principles of the disclosure.

FIG. 3 shows a structural overview of non-ICS UE reference architecture 300, constructed according to the principles of the disclosure. The non-ICS UE reference architecture 300 may involve a Visited Mobile Switching Center (VMSC) 310, ICCF 320 and CSCF 330 and non-ICS UE 340. The VMSC is a Mobile Switching Center (MSC) located at the customer side to provide various services. In particular, Mobile Switching Center (MSC) is a sophisticated telephone exchange which provides PS calling, mobility management, and GSM services to the mobile phones roaming within the area that it serves (e.g., voice, data and fax services, SMS, call divert and the like).

As mentioned above with reference to FIG. 1B, the CAAF may provide necessary adaptation required to enable a Remote User Agent (RUA). The RUA may perform SIP User Agent functions on behalf of the UE for the IMS network over CS sessions. Also, the RUA may combine the CS calls established between the ICS UE and the RUA to set up a voice bearer, and the ICCC established between the RUA and the ICS UE either directly or via the CS Access Adaptation Function (CAAF). In the non-ICS UE reference architecture 300, the CS Access Adaptation Function (CAAF) may be exclusively provided as a network function. A CAAF component in the IMS CS Control Function (ICCF) 320 may be referred to as Remote CS Access Adaptation Function (R-CAAF) 322, and a CAAF component in the VMSC 310 may be referred to as Local CS Access Adaptation Function (L-CAAF-n) 312. The L-CAAF-n 312 and R-CAAF 322 may use service control signaling to communicate over ICCC in a manner similar to the ICS UE 110 and the ICCF 120 shown in FIG. 1. Similar to FIG. 1, reference connection $I_y$ in FIG. 3 may be used between the ICCF 320 and the Call Session Control Function (CSCF) 330 for presentation of the SIP User Agent (UA) behavior toward the IMS network for controlling a user session. However, reference connection $I_x$ may be used between the L-CAAF 312 in the VMSC 310 and the R-CAAF in the ICCF 320 to establish and control the ICCC. Thus, according to the disclosure, even non-ICS UE may be configured to process the USSD messages when MS is busy with a call or MMI activity by sending the received USSD message to all of the applications registered in MS and sending a response from the L-CAAF to the network.

Figure 4:
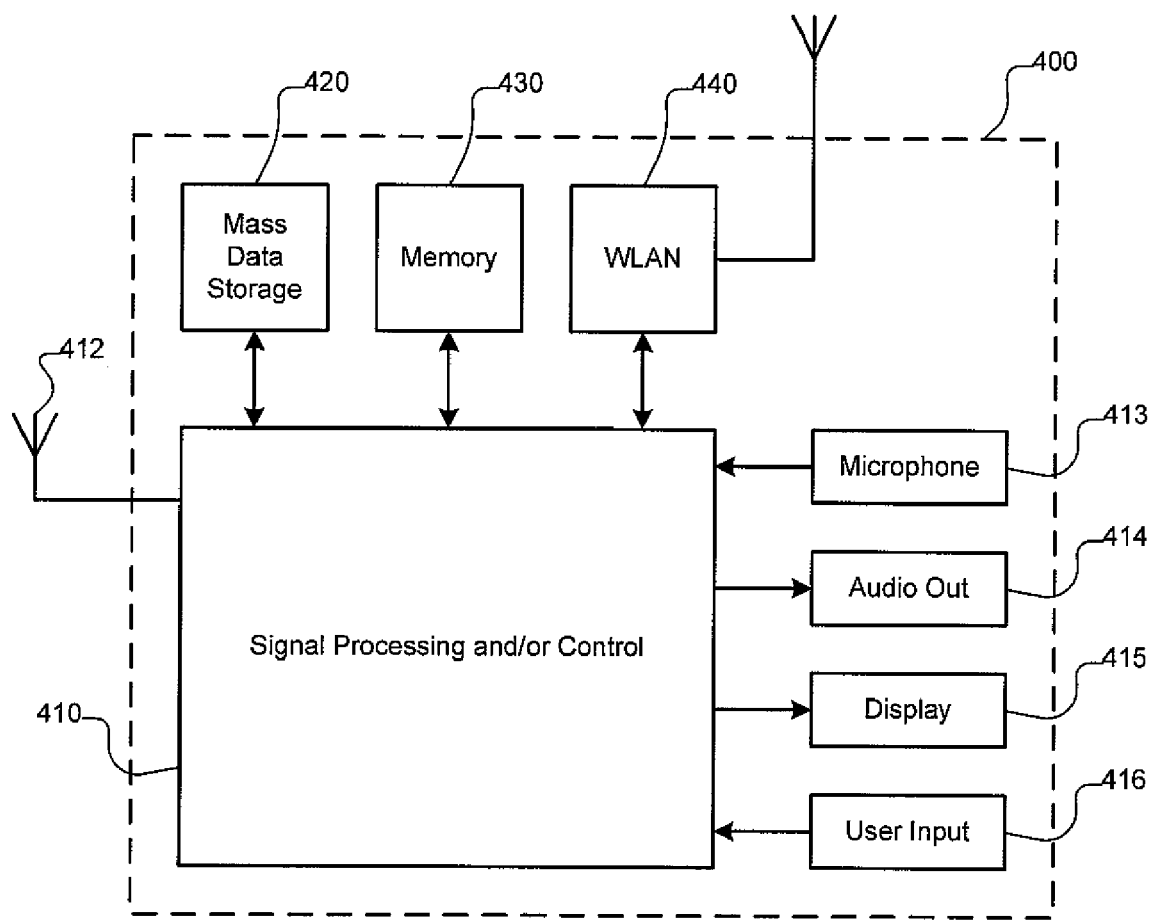
FIG. 4 shows an example of an application in accordance with an embodiment of the disclosure.

Referring now to FIG. 4, the system and method may be at least partially embodied in a cellular phone 400 that may include a cellular antenna 412 to provide services in both PS and CS networks. The system and method may implement either or both signal processing and/or control circuits, which are generally identified in FIG. 4 at 410 and/or a WLAN interface 440. In some implementations, the cellular phone 400 includes a microphone 413, an audio output 414 such as a speaker and/or audio output jack, a display 415 and/or an input device 416 such as a keypad, pointing device, voice actuation and/or other input device. Signal processing and/or control circuits 410 and/or other circuits (not shown) in the cellular phone 400 may process data, perform coding and/or encryption, perform calculations, format data and/or perform other cellular phone functions. The cellular phone 400 also may support connections with a WLAN via the WLAN network interface 440.

In accordance with various embodiments of the disclosure, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the disclosure described herein are intended for operation as software programs running on a computer processor. Furthermore, alternative software implementations including, but not limited to, distributed processing, component/object distributed processing, parallel processing, virtual machine processing, any future enhancements, or any future protocol can also be used to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored. FIG. 4 shows an illustrative application of the disclosure.

Although reference is made to some specific communication protocols, any protocol is within the scope of the system and method. For example, Bluetooth, Wi-Fi, WiMAX, Ultra Wideband (UWB), Wideband Code-Division Multiple Access (WCDMA) or any other known technology using a licensed or unlicensed frequency band. Moreover, any future enhancement of a current protocol or any future protocol is contemplated for use with the system and method.

While the disclosure has been described in terms of exemplary embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A method of handling Service Data initiated by a wireless network for a mobile station, the mobile station configured to operate in a circuit-switched network and a packet-switched network, the method comprising:

selectively registering a Circuit Switched Access Adaptation Function in the mobile station for Supplementary Service;

while there is man-machine interface activity at the mobile station, receiving a Service Data message at the mobile station, wherein the Service Data message is initiated by the wireless network;

in response to the Circuit Switched Access Adaptation Function being registered in the mobile station for Supplementary Service, sending the Service Data message to all of a plurality of applications registered in the mobile station, wherein the plurality of applications includes the Circuit Switched Access Adaptation Function; and in response to the Circuit Switched Access Adaptation Function not being registered in the mobile station for Supplementary Service, rejecting the Service Data message.

2. The method of claim 1, further comprising:

determining whether the Circuit Switched Access Adaptation Function responds to the Service Data message; and sending a response from the Circuit Switched Access Adaptation Function to the wireless network when the Circuit Switched Access Function responds to the Service Data message.

3. The method of claim 1, further comprising:

receiving a second Service Data message when there is no man-machine interface activity; and processing the second Service Data message.

4. The method of claim 2, further comprising the step of rejecting the Service Data message when the Circuit Switched Access Adaptation Function does not respond to the Service Data message.

5. The method of claim 1, wherein the Service Data comprises Unstructured Supplementary Service Data, and the Circuit Switched Access Adaptation Function comprises a Local Circuit Switched Access Adaptation Function.

6. A non-transitory computer readable medium having a stored computer program embodying instructions, which, when executed by a computer, cause the computer to handle Service Data initiated by a wireless network for a mobile station, the mobile station configured to operate in a circuit-switched network and a packet-switched network, the computer readable medium comprising:

instructions for selectively registering a Circuit Switched Access Adaptation Function to the mobile station for Supplementary Service;

instructions for receiving, at the mobile station, a Service Data message while the mobile station is engaged in man-machine interface activity, wherein the Service Data message is initiated by the wireless network;

instructions for, in response to the Circuit Switched Access Adaptation Function being registered in the mobile station for Supplementary Service, sending the Service Data message to all of a plurality of applications registered in the mobile station, wherein the plurality of applications includes the Circuit Switched Access Adaptation Function; and instructions for, in response to the Circuit Switched Access Adaptation Function not being registered in the mobile station for Supplementary Service, rejecting the Service Data message.

7. The computer readable medium of claim 6, further comprising:

instructions for determining whether the Circuit Switched Access Adaptation Function responds to the Service Data message; and instructions for sending the response from the Circuit Switched Access Adaptation Function to the wireless network when the Circuit Switched Access Adaptation Function responds to the Service Data message.

8. The computer readable medium of claim 6, further comprising:

instructions for receiving a second Service Data message when there is no man-machine interface activity; and instructions for processing the second Service Data message.

9. The computer readable medium of claim 6, further comprising instructions for rejecting the Service Data message upon determining that the Circuit Switched Access Adaptation Function does not respond to the Service Data message.

10. The computer readable medium of claim 6, wherein the mobile station is configured for Voice Call Continuity.

11. The computer readable medium of claim 6, wherein the Service Data comprises Unstructured Supplementary Service Data, and the Circuit Switched Access Function comprises a Local Circuit Switched Access Adaptation Function.

12. A mobile station configured to handle Service Data initiated by a wireless network, comprising:

an IP Multimedia Service Control module configured to selectively register a Circuit Switched Access Adaptation Function to the mobile station for Supplementary Service; and a Call Session Control module configured to receive a Service Data message while the mobile station is engaged in man-machine interface activity, wherein the Service Data message is initiated by the wireless network;

in response to the Circuit Switched Access Adaptation Function being registered in the mobile station for Supplementary Service, send the Service Data message to all of a plurality of applications registered in the mobile station, wherein the plurality of applications includes the Circuit Switched Access Adaptation Function; and in response to the Circuit Switched Access Adaptation Function not being registered in the mobile station for Supplementary Service, reject the Service Data message.

13. The mobile station of claim 12, wherein the IP Multimedia Service Control module is further configured to determine whether the Circuit Switched Access Function responds to the Service Data message, and the Call Session Control module is further configured to send the response from the Circuit Switched Access Function to the wireless network when the Circuit Switched Access Function responds to the Service Data message.

14. The mobile station of claim 12, wherein the IP Multimedia Service Control module is further configured to reject the Service Data message upon determining that the Circuit Switched Access Function does not respond to the Service Data message.

15. The mobile station of claim 12, wherein the mobile station is configured for Voice Call Continuity.

16. The mobile station of claim 12, wherein the Service Data comprises Unstructured Supplementary Service Data, and the Circuit Switched Access Function comprises a Local Circuit Switched Access Adaptation Function.

17. A system for an Internet Protocol Multimedia Subsystem network, comprising:

a non-Internet Protocol Multimedia Subsystem Centralized Services User Equipment (non-ICS UE) roaming within the Internet Protocol Multimedia Subsystem network;

a Mobile Switching Center configured to provide circuit-switched domain calling services to the non-ICS UE;

a Call Session Control function responsible for signaling of the Internet Protocol Multimedia Subsystem network; and an Internet Protocol Multimedia Subsystem Centralized Service Control Function configured to control the signaling between the Internet Protocol Multimedia Subsystem network and the Mobile Switching Center when the non-ICS UE accesses the Internet Protocol Multimedia Subsystem network via the circuit-switched domain, and further configured to register the non-ICS UE for Supplementary Service, wherein the non-ICS UE is configured to
receive a Service Data message while the non-ICS UE is engaged in man-machine interface activity, wherein the Service Data message is initiated by the Internet Protocol Multimedia Subsystem network;
in response to the non-ICS UE being registered for Supplementary Service, send the Service Data message to all of a plurality of applications registered in the non-ICS UE, wherein the plurality of applications includes the Circuit Switched Access Adaptation Function; and
in response to the non-ICS UE not being registered for Supplementary Service, reject the Service Data message.

18. The system of claim 17, wherein the Mobile Switching Center is a Visited Mobile Switching Center.

19. The system of claim 18, further comprising a first reference point established between the Internet Protocol Multimedia Subsystem Centralized Service Control Function and the Call Session Control Function for presentation of a Session Initiation Protocol User Agent to the Internet Protocol Multimedia Subsystem network for controlling user sessions.

20. The system of claim 19, further comprising a second reference point established between the Visited Mobile Switching Center and the Internet Protocol Multimedia Subsystem Centralized Service Control Function to establish and control the Internet Protocol Multimedia Subsystem Centralized Services Control Channel.

21. The system of claim 20, wherein the Visited Mobile Switching Center comprises a Local Circuit Switched Access Adaptation Function.

22. The system of claim 21, wherein the Internet Protocol Multimedia Subsystem Centralized Service Control Function comprises:
a Remote Circuit Switched Access Adaptation Function; and
a Remote User Agent configured to perform Session Initiation Protocol user agent functions on circuit-switched sessions for the non-ICS UE in the Internet Protocol Multimedia Subsystem network.

23. The system of claim 22, wherein the second reference point is established between the Local Circuit Switched Access Adaptation Function and the Remote Circuit Switched Access Adaptation Function to convey the control signaling between the non-ICS UE and the Remote User Agent.

24. The system of claim 23, wherein the Local Circuit Switched Access Adaptation Function and the Remote Circuit Switched Access Adaptation Function are exclusively provided as an Internet Protocol Multimedia Subsystem network function.

25. A system for an Internet Protocol Multimedia Subsystem network, comprising:
a mobile station roaming within the Internet Protocol Multimedia Subsystem network;
a Call Session Control Function responsible for signaling of the Internet Protocol Multimedia Subsystem network; and
an Internet Protocol Multimedia Subsystem Centralized Service Control Function configured to control the signaling between the Internet Protocol Multimedia Subsystem network and the mobile station when the mobile station accesses the Internet Protocol Multimedia Subsystem network via a circuit-switched domain, and further configured to register the mobile station for Supplementary Service, wherein the mobile station is configured to
receive a Service Data message while the mobile station is engaged in man-machine interface activity, wherein the Service Data message is initiated by the Internet Protocol Multimedia Subsystem network;
in response to the mobile station being registered for Supplementary Service, send the Service Data message to all of a plurality of applications registered in the mobile station, wherein the plurality of applications includes the Circuit Switched Access Adaptation Function; and
in response to the mobile station not being registered for Supplementary Service, reject the Service Data message.

26. The system of claim 25, further comprising a first reference point established between the Internet Protocol Multimedia Subsystem Centralized Service Control Function and the Call Session Control Function for presentation of a Session Initiation Protocol User Agent behavior toward the Internet Protocol Multimedia Subsystem network for controlling user sessions.

27. The system of claim 26, further comprising a second reference point established between the mobile station and the Internet Protocol Multimedia Subsystem Centralized Service Control Function to establish and control an Internet Protocol Multimedia Subsystem Centralized Services Control Channel.

28. The system of claim 27, wherein the mobile station comprises a Local Circuit Switched Access Adaptation Function.

29. The system of claim 28, wherein the Internet Protocol Multimedia Subsystem Centralized Service Control Function comprises:
a Remote Circuit Switched Access Adaptation Function; and
a Remote User Agent configured to perform Session Initiation Protocol user agent functions on circuit-switched sessions for the mobile station in the Internet Protocol Multimedia Subsystem network.

30. The system of claim 29, wherein the second reference point is established between the Local Circuit Switched Access Adaptation Function and the Remote Circuit Switched Access Adaptation Function to convey the control signaling between the mobile station and the Remote User Agent.

31. The system of claim 30, wherein the Local Circuit Switched Access Adaptation Function and the Remote Circuit Switched Access Adaptation Function are exclusively provided as an Internet Protocol Multimedia Subsystem network function.

* * * * *